Jan. 16, 1968   PER-ÅKE ALBERTSSON   3,363,991
ROTARY SEDIMENTATION AND COUNTER-CURRENT EXTRACTION APPARATUS
Filed Oct. 1, 1964
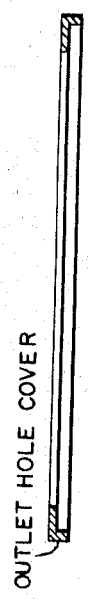
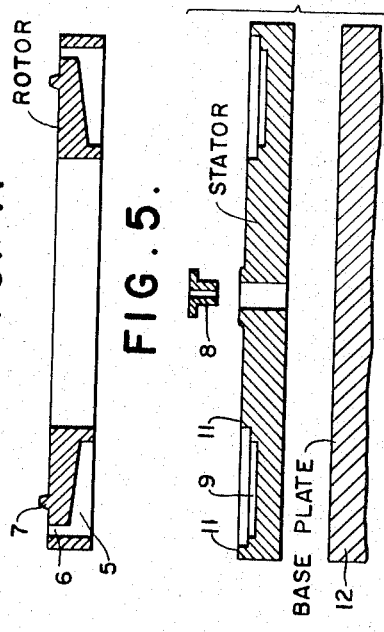
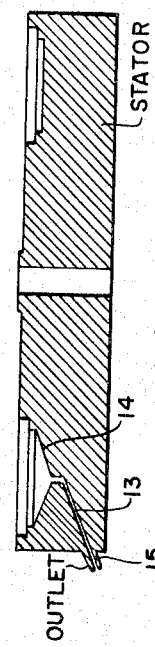
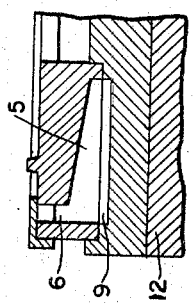
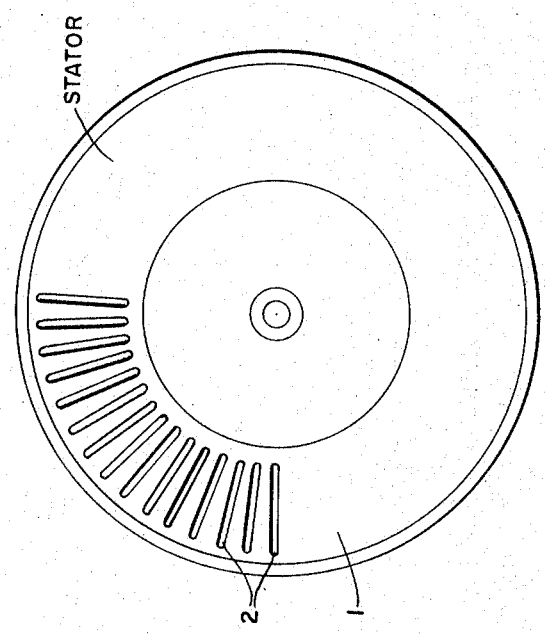
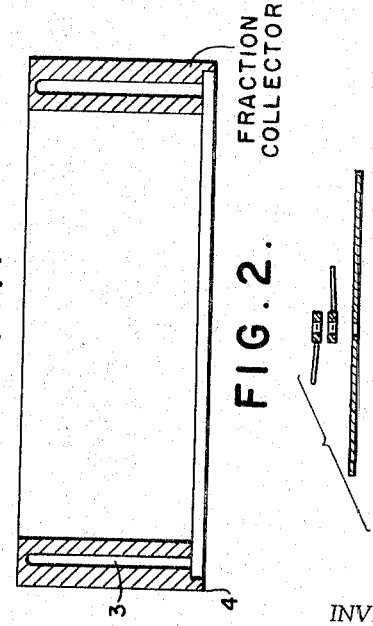
INVENTOR
Per-Åke Albertsson
BY *Spencer & Kaye*
ATTORNEYS

United States Patent Office 3,363,991
Patented Jan. 16, 1968

3,363,991
ROTARY SEDIMENTATION AND COUNTER-
CURRENT EXTRACTION APPARATUS
Per-Åke Albertsson, Uppsala, Sweden, assignor to
LKB-Produkter AB, Stockholm, Sweden
Filed Oct. 1, 1964, Ser. No. 400,643
Claims priority, application Great Britain, Oct. 1, 1963,
38,561/63
19 Claims. (Cl. 23—269)

ABSTRACT OF THE DISCLOSURE

Apparatus for counter-current extraction and separation sedimentation of substances in liquids containing said substances in the dissolved or suspended state. The apparatus has a substantially cylindrical stator provided with an annular groove concentric to the vertical stator axis. A number of shallow cavities are present in this groove, forming the lower parts of sedimentation cells. An annular rotor provided with similar cavities of identical horizontal cross section is designed to fit in the groove and turn about the stator axis. The cavities in the rotor form the upper parts of the sedimentation cells and have openings in the top to permit the introduction of the liquids and the substrate. The apparatus when designed for counter-current extraction or sedimentation separation has a relation between the horizontal cross section area and the depth of the lower parts of the cells of at least 1.5 cm.$^2$ or 10 cm.$^2$ cross section area to 1 cm. depth respectively.

---

The present invention relates to sedimentation and to separation and/or fractionation of substances by counter-current extraction in liquids containing said substances in the dissolved or suspended state in a multi-phase liquid system.

Apparatus for counter-current extraction between two liquid phases has been known in the art for a long time. For example, in Analytical Chemistry, vol. 21 (1949), pp. 500–504, Lyman C. Craig and Otto Post describe an apparatus for counter-current extraction, the main elements of which consists of two cylinders, arranged one above the other in each of which are fixed equal numbers of tubes parallel with the vertical cylinder axis. The end surfaces of said cylinders and tubes are ground smooth so that the tubes in the two cylinders fit snugly against each other when the two cylinders are placed end against end in the axial direction. The upper and the lower surfaces of the two interposed cylinders are closed by plane discs. The unit so formed is fixed in a stand and provided with mechanical means for the compression of one cylinder against the other to prevent the leakage of liquid between the several different tubes or out of the apparatus.

The two cylinders containing the tubes are cradled about their central axes, the upper one being turnable in relation to the lower so that each of the tubes located in the upper cylinder may be brought to coincide axially with each of the tubes in the lower cylinder. The number of the tubes is usually 25, numbered 0–24.

The mode of operation of the above-described apparatus is as follows. The tubes in the lower part of the apparatus are completely filled from above with the one liquid phase. In the upper tubes a corresponding large volume of the second liquid phase is introduced; these tubes are not completely filled, however, so they will also contain a certain volume of air. The substrate is introduced into tube No. 0 and brought into solution by turning the whole apparatus around a horizontal axis causing the air to pass up and down. When the substrate has been distributed between the two liquid phases and the liquids have separated by gravity, the force pressing the two cylinders together is diminished and the upper cylinder turned around the central axis so that one tube therein coincides with the adjacent tube in the lower cylinder. The pressing force is then increased again, and by the turning of the apparatus the air bubbles in the upper parts of the tubes are caused to move along the tubes to mix the two liquid phases so that partition is again attained. After allowing the phases to separate, the described procedure is repeated, for instance until a complete cycle of the apparatus has been made. Each of the upper tubes has then been in contact with each of the lower tubes in the apparatus and the substrate has been distributed over the tubes according to its distribution ratio.

However, the above-described apparatus exhibits a number of major disadvantages. First, high mechanical pressure is necessary to prevent leakage of liquid from the cells. This makes the apparatus complicated to manufacture and difficult to use. Second, a relatively long time is required for attaining the phase separation. This is due to the high relation between the height of the tubes and their volume. This second disadvantage is especially noticeable when solvent systems of a high viscosity and systems containing unstable substances, for instance substances of biological origin, are used.

It is an object of the present invention to eliminate the above-defined disadvantages in an apparatus for counter-current extraction of the above-described type.

It is also an object of the invention to design an apparatus which is suitable for separation by sedimentation of particles suspended in a liquid phase, e.g. particles of organic nature, such as cells or parts thereof which usually are of an unstable nature.

The apparatus according to the present invention comprises a substantially cylindrical element, the stator, the diameter of which is considerably larger than its height, having its axis in the vertical direction. The upper surface of the stator is provided with a wide, relatively shallow annular groove concentric with the cylinder axis. In said groove a number of shallow cavities are present, which cavities form the lower parts of the partition or sedimentation cells of the apparatus. In said groove on the upper surface of the stator is located a substantially circular disc, the rotor, the central axis of which coincides with the axis of the cylindrical stator. The rotor is turnable around said axis and is guided, for instance, by the inner and the outer edges of the groove in the stator. The lower surface of the rotor which interacts with the groove of the stator is provided with shallow cavities of the same horizontal cross section, the number of the cavities in the stator and the rotor being the same and the depth of the cavities in the rotor being somewhat greater than the depth of the cavities in the stator. Said cavities in the rotor form the upper parts of the partition cells of the apparatus. By turning the rotor in relation to the stator one cavity in the rotor can be brought to coincide with each individual cavity in the stator, the other cavities in the rotor then coinciding with the corresponding cavities in the stator so that a circular sequence of comparatively shallow cells is formed.

Each of the upper parts of said cells, which are present in the rotor, is provided with a hole directed upwards, which hole is intended for filling and emptying the partition liquids as well as for introducing the substrate. In order to close said holes in the rotor a shutting device is provided, which suitably consists of a plane circular disc. The dissolution of the substrate and the mixing of the partition phases is mainly achieved by horizontal movements of the apparatus, for instance by the aid of a shaker.

A characteristic feature of the counter-current extraction apparatus according to the present invention is that the depth of the lower parts of the partition cells is small in relation to the horizontal cross section area of the same. For counter-current extraction the relation between the horizontal cross section area and the depth of the lower parts of the cells is at least 1.5 cm.$^2$ per cm., preferably 10–100 cm. and at most preferably 15–30 cm.$^2$ per cm., whereas for sedimentation separation said relation is at least 10 cm.$^2$ per cm., and preferably over 100 cm.$^2$ per cm. For the purpose of ordinary laboratory work it is suitable that the lower parts of the cells have a depth of about 0.01–2 cm., preferably 0.1–0.5 cm., e.g. 0.2 cm., and that their horizontal cross section area is about 3–20 cm.$^2$. Also smaller cross sections, e.g. 0.5 cm.$^2$, may be used for apparatus in micro-scale but in this case too the above-mentioned rule regarding the ratio between cross section area and depth has to be observed. When the apparatus is to be used for larger quantities of liquid suspensions or similar substrates a greater depth of the lower parts of the cells may be suitable, said depth being within the above-defined intervals.

The total number of partition cells in the apparatus may vary within wide limits. In general it has been found practicable that the number of cells be in the range of 20–200.

In comparison with previously known apparatus of a similar type the small depth of the upper parts of the partition cells of the apparatus according to the present invention—which upper parts of the partition cells are somewhat deeper than the lower parts but have still a rather small depth—has the advantage of allowing only a correspondingly low hydrostatic pressure at the surface between the stator and the rotor. Said low hydrostatic pressure considerably diminishes the leakage problem, makes a compressing means unnecessary and the apparatus very easy to operate and to clean. The required tightness is obtained solely by the close fit of all contacting surfaces.

According to the invention the inner and the outer rims limiting the annular groove of the stator are made suitably high so as to prevent accidental leakage of liquid from the apparatus.

A further important advantage of the apparatus according to the invention when used for thin layer counter-current extraction is that it is possible to use extraction liquids or partition liquids of a high viscosity, for instance aqueous solutions of high molecular substances like dextran, polyethylene glycol and similar media, in which case both phases may consist of aqueous solutions.

A still further important advantage of the apparatus according to the present invention is that the complete phase separation is obtained in considerably less time than with previously known apparatus, for instance with the apparatus described by Craig and Post. This gain of time is of considerable importance especially when working with phase systems having a long separation time, for instance due to a low density difference between the phases and/or high viscosity.

It has been found suitable to manufacture all main parts of the apparatus according to the invention of transparent plastics with good mechanical and chemical properties, e.g. acrylic plastics. These materials may be brought to the desired form, for instance, by casting or extruding and, if necessary, a subsequent mechanical finishing such as lathing, grinding, honing, etc. The use of plastics of the above-defined type is also advantageous for the reason that water does not usually adhere to them; this decreases the risk of leakage and facilitates the emptying of the cells. The transparency of the plastics facilitates ocular inspection of the phase separation.

The apparatus according to the invention can also be provided with an outlet opening in one of the cells to allow counter-current extraction with the "single withdrawal" technique as described by L. C. Craig and D. Craig in Technique of Organic Chemistry, edited by A. Weissberger, vol. III, part 1, 2nd edition, Interscience Publishers, New York (1956). With such an outlet opening in one of the cells it is possible to empty the cell for further treatment of its contents.

The apparatus according to the present invention is further described with reference to the accompanying drawings in which FIG. 1 is a vertical view of the stator of an apparatus according to the invention; FIG. 2 is a cross sectional view of an emptying device, the fraction collector; FIG. 3 shows a circular plate and two nuts (preferably with handles for quick operation) used for fixing the assembled apparatus to the shaker; FIG. 4 is a cross-sectional view of the circular disc covering the outlet holes on the upper surface of the rotor; FIG. 5 is a cross-sectional view of the rotor; FIG. 6 is a cross-sectional view of the stator with the under-lying base plate of the shaker, the central shaft of which is indicated by dotted lines; FIG. 6A shows a stator in which one of the cells is provided with an outlet opening for the above-mentioned single withdrawal technique; and FIG. 7 is a cross-sectional view of a part of the assembled apparatus according to the invention.

In FIG. 1 the annular groove on the upper surface of the stator is indicated by 1 and the stator part of one partition cell is indicated by 2.

In FIG. 2, 4 indicates one of the tubes of the fraction collector the function of which is described later on and 4 is a rim keeping the fraction collector coaxial with the center axis of the apparatus.

In FIG. 5 the rotor part of one partition cell is indicated by 5, the upper surface of which is sloping towards the outlet hole 6 in order to facilitate the emptying of the cells. For facilitating of the manual handling of the turned rotor two knobs 7 are arranged on the top surface of the rotor.

In FIG. 6 a central bushing 8 is shown which is used for fixing the stator to the central shaft of the shaker. The stator part of one partition cell is indicated by 9, the annular groove on the stator by 10 and the rims around the annular groove by 11. The base plate of the shaker is indicated by 12.

FIG. 6A, as has been mentioned above, shows a stator in which one of the cells is provided with an outlet opening 13, the bottom surface 14 of the cell being sloped so as to facilitate the complete emptying of the contents of the cell. The outlet opening is provided with a suitable means 15 for the attachment, for instance, of a flexible rubber tube.

FIG. 7 is a cross-sectional view along the center line of a partition cell of the assembled apparatus showing the stator, the rotor and the disc covering the outlet holes on the upper surface of the rotor.

After completed partition the circular covering disc is removed from the upper surface of the rotor and replaced by the fraction collector which fits tightly against the upper surface of the rotor. With said device in position the whole apparatus is turned up-side down and the contents of the cells runs down into corresponding tubes, one for each partiton cell, and samples of the different phases can be removed with the aid of a pipette or similar tool.

When the apparatus is used for sedimentation the sample is introduced into the first cell, whereas the remaining cells may be filled with another liquid, such as pure water. The rotor is moved at intervals, so that each of the rotor parts of the cells coincides with the corresponding stator parts, usually one complete turn, whereupon the sedimented particles in the stator parts of the cells are suspended in the other liquid by shaking and, if desired, transferred to the fraction collector.

What I claim is:

1. Apparatus for counter-current extraction containing a number of cells, which are radially arranged around a vertical axis at equal distances from each other and from said axis, each cell being divided into a lower and an upper part, the lower parts of the cells being present in a stator and the upper parts of the cells being present in a rotor, the upper and lower parts of the cell having coincident openings, the rotor and the stator having engaging horizontal planar lower and upper surfaces respectively to seal the upper and lower parts of the cell, means for introducing liquid mixture into each of the upper parts of the respective cells, means for rotating the rotor in the horizontal plane about said vertical axis so that one individual lower part of a cell can be brought to coincide with every upper part of the cells, the remaining upper and lower parts of the cells then also coinciding in couples in which the relation between the horizontal cross section area and the depth of the lower parts of the cells is at least 1.5 cm.$^2$ cross section area of 1 cm. depth.

2. Apparatus according to claim 1 in which the relation between the horizontal cross section area and the depth of the lower parts of the cells is between 10 and 100 cm.$^2$ cross section area to 1 cm. depth.

3. Apparatus according to claim 1 in which the relation between the horizontal cross section area and the depth of the lower parts of the cells is between 15 and 30 cm.$^2$ cross section area to 1 cm. depth.

4. Apparatus for sedimentation separation containing a number of cells, which are radially arranged around a vertical axis at equal distances from each other and from said axis, each cell being divided into a lower and an upper part, the lower parts of the cells being present in a stator and the upper parts of the cells being present in a rotor, the upper and lower parts of the cell having coincident openings, the rotor and the stator having engaging horizontal planar lower and upper surfaces respectively to seal the upper and lower parts of the cell, means for introducing liquid mixture into each of the upper parts of the respective cells, means for rotating the rotor in the horizontal plane about said vertical axis including a fraction collector having a planar surface for engaging the upper surface of said rotor and so that one individual lower part of a cell can be brought to coincide with every upper part of the cells, the remaining upper and lower parts of the cells then also coinciding in couples in which the relation between the horizontal cross section area and the depth of the lower parts of the cells is at least 10 cm.$^2$ cross section area to 1 cm. depth.

5. Apparatus according to claim 4 in which the relation between the horizontal cross section area and the depth of the lower parts of the cells is at least 100 cm.$^2$ cross section area to 1 cm. depth.

6. Apparatus according to claim 1 in which the depth of the lower parts of the cells is in the range 0.01–2 cm.

7. Apparatus according to claim 4 in which the depth of the lower parts of the cells is in the range 0.01–2 cm.

8. Apparatus according to claim 1 which is especially adapted for micro-scale work in which the horizontal cross section area of each of the partition cells is below 3 cm.$^2$.

9. Apparatus according to claim 4 especially adapted for micro-scale work in which the horizontal cross section area of each of the sedimentation cells is below 3 cm.$^2$.

10. Apparatus according to claim 1 in which the stator is provided with rims so as to prevent accidental leakage of liquid from the apparatus.

11. Apparatus according to claim 4 in which the stator is provided with rims so as to prevent accidental leakage of liquid from the apparatus.

12. Apparatus according to claim 1 in which the seal between the stator and the rotor parts of the apparatus is attained mainly by the planeness of the contact surfaces and without the aid of compressing means.

13. Apparatus according to claim 4 in which the seal between the stator and the rotor parts of the apparatus is attained mainly by the planeness of the contact surfaces and without the aid of compressing means.

14. Apparatus according to claim 1 which is made of a transparent polyacrylic transparent plastic which is not substantially wetted by water.

15. Apparatus according to claim 4 which is made of a transparent polyacrylic plastic which is not substantially wetted by water.

16. Apparatus according to claim 1 in which the lower part of one of the cells is provided with a sloping bottom surface and an outlet duct leading from said surface for drawing-off of the contents of the cell.

17. Apparatus according to claim 4 in which the lower part of one of the cells is provided with a sloping bottom surface and an outlet duct leading from said surface for drawing-off of the contents of the cell.

18. Apparatus according to claim 1 including a fraction collector having a planar surface for engaging the upper surface of said rotor and consisting of vertical tubes arranged in a preferably cylindrical body and corresponding to the outlet holes on the upper surface of the rotor.

19. Apparatus according to claim 4 including a fraction collector having a planar surface for engaging the upper surface of said rotor and consisting of vertical tubes arranged in a preferably cylindrical body and corresponding to the outlet holes on the upper surface of the rotor.

References Cited
UNITED STATES PATENTS

| | | | |
|---|---|---|---|
| 1,248,232 | 11/1917 | Wilson | 73—61 |
| 2,449,238 | 9/1948 | Lightfoot | 73—61 |
| 2,809,020 | 10/1957 | Magee | 73—61 |
| 3,047,368 | 7/1962 | Morco | 23—290.5 X |

OTHER REFERENCES

| | | |
|---|---|---|
| 1,107,541 | 8/1955 | France. |

NORMAN YUDKOFF, *Primary Examiner.*

S. EMERY, *Assistant Examiner.*